(12) United States Patent
Yamada et al.

(10) Patent No.: US 6,438,680 B1
(45) Date of Patent: Aug. 20, 2002

(54) MICROPROCESSOR

(75) Inventors: Akira Yamada; Isao Minematsu, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,831

(22) Filed: Jun. 3, 1999

(30) Foreign Application Priority Data

Jan. 19, 1999 (JP) .............................. 11-011202

(51) Int. Cl.[7] .............................. G06F 9/38; G06F 9/40; G06F 9/22

(52) U.S. Cl. ....................... 712/210; 712/247; 712/213; 712/212; 712/211; 712/207; 712/220; 712/23; 711/214; 711/212; 711/213; 711/215

(58) Field of Search ................ 712/215, 217, 712/23, 210, 178, 212, 216, 219, 207, 213, 235, 230, 218, 236, 244, 211, 287, 709, 247, 41, 123, 24, 220, 245, 206, 242; 711/214, 245, 212, 213, 215

(56) References Cited

U.S. PATENT DOCUMENTS 3,983,539 A * 9/1976 Faber et al. ................ 712/247
5,894,582 A * 4/1999 Yoshida et al. ............. 712/23

FOREIGN PATENT DOCUMENTS

JP        A-6/342371    12/1994
JP        A-9/212363    8/1997

OTHER PUBLICATIONS

David A. Patterson and John L. Hennessy "Computer Architecture a Quantitative Approach", 1996, second edition, pp. 146–285, Morgan Kaufmann Publishers, Inc., ISBN 1-55860-329-8.

* cited by examiner

Primary Examiner—Daniel H. Pan
(74) Attorney, Agent, or Firm—Burns, Doane, Swecker & Mathis, LLP

(57) ABSTRACT

When a decision circuit (217) incorporated in a control circuit (21) in an instruction decode unit (2) in a microprocessor (1) decides that an integer operation unit (4) can not execute a following sub instruction, the decision circuit (217) controls each of selectors (211, 214, and 215) and an exchange circuit (216) so that a memory access unit (3) that has already executed a preceding sub instruction can execute the following sub instruction.

5 Claims, 11 Drawing Sheets

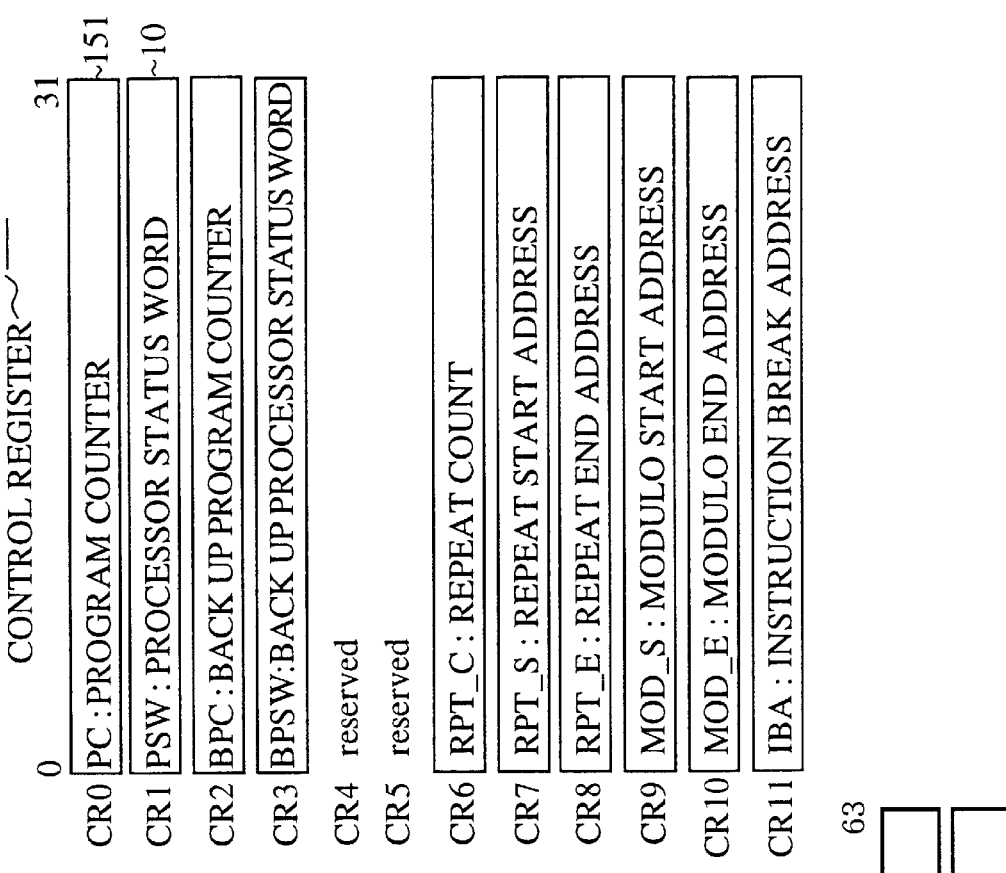
FIG.4B
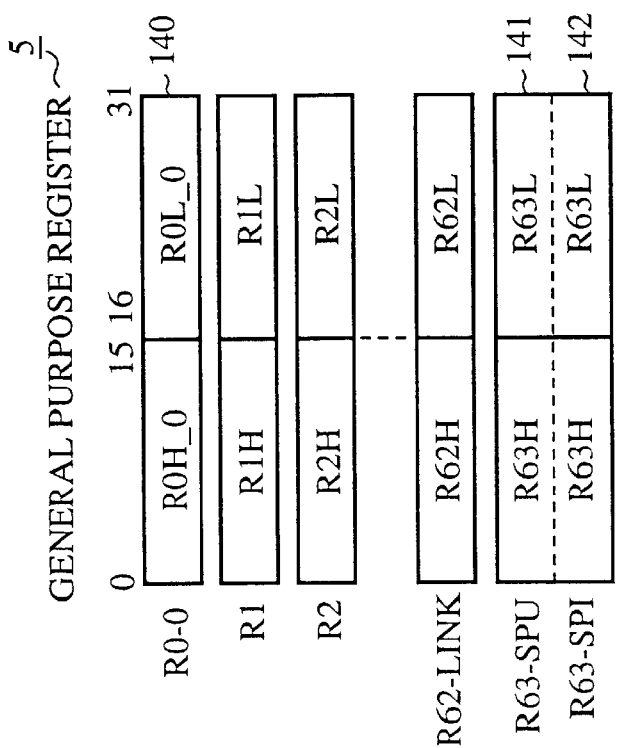
FIG.4A
FIG.4C

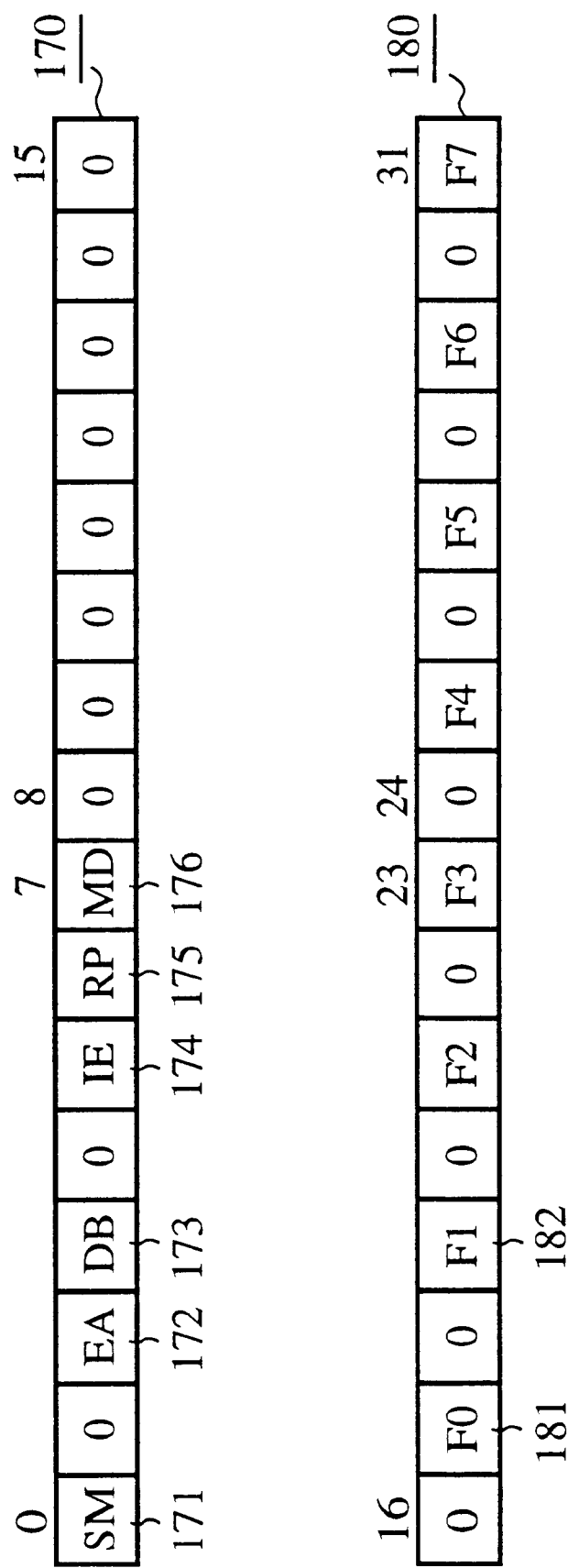

MICROPROCESSOR

BACKGROUND OF THE INVENTION

1. Field of the Invention

The present invention relates to a microprocessor capable of executing instructions, each instruction including a plurality of sub-instructions, in an instruction group.

2. Description of the Related Art

Microprocessors having the function of parallel processing such as pipeline are widely and commonly used in order to increase the performance of the microprocessor such as operation speed and so on. A VLIW (Very Long Instruction Word) architecture has been proposed and used in microprocessors as one of methods for parallel processing.

In order to increase the performance such as the operation speed and so on, the microprocessors of the VLIW architecture can execute a plurality of sub instructions included in a single instruction, in parallel, that are used for controlling the operation of a plurality of operation units incorporated in the microprocessor. Each of the plurality of operation units can operate independently to each other.

Because the conventional microprocessor of the VLIW architecture has the configuration described above, in the case that sub-instructions can not be executed in parallel when a data hazard happens between operation units, a NOP (No Operation) instruction is provided to the operation unit that can not execute the sub instruction, namely the operation unit must wait to initiate the execution of the sub instruction until the data hazard is completely eliminated.

This drawback of the conventional microprocessor of the VLIW architecture causes to decrease the efficiency of decoding and executing the instructions.

SUMMARY OF THE INVENTION

Accordingly, an object of the present invention is, with due consideration to the drawbacks of the conventional technique, to provide a microprocessor of a VLIW architecture capable of executing instructions, each comprising a plurality of sub-instructions, and having a function to increase the operation efficiency by controlling the operation flow in which a following sub instruction is executed by the operation unit that has executed a preceding sub instruction when another operation unit can not execute the following sub instruction by the occurrence of a data hazard in a sequential processing per operation unit, for example.

In accordance with a preferred embodiment of the present invention, a microprocessor comprises memory circuit, instruction decode unit, a plurality of registers, a plurality of instruction execution means, and control circuit. The memory circuit stores instructions for a single operation. Each instruction includes a plurality of sub instructions for controlling a plurality of operations and data. The instruction decode unit decodes the instructions that are read from said memory circuit. The plurality of registers stores control data to control the execution of said instructions. The plurality of instruction execution means, that are connected to said instruction decode unit, execute said plurality of sub instructions sequentially and independently in parallel, based on decoded results of said instructions transferred from said instruction decode unit and control data stored in said plurality of registers. The control circuit, that is incorporated in said instruction decode unit, controls said plurality of instruction execution means so that a first instruction execution means that has executed a first sub instruction can execute a following second sub instruction when said plurality of instruction execution means execute said plurality of sub instructions sequentially.

In the microprocessor as another preferred embodiment according to the present invention, said control circuit controls so that said first instruction execution means executes said following second sub instruction when said control circuit decides that a second instruction execution means in said plurality of instruction execution means can not execute said following second sub instruction.

In the microprocessor as another preferred embodiment according to the present invention, said control circuit controls so that second instruction execution means in said plurality of instruction execution means executes said following second sub instruction when said control circuit decides that said second instruction execution means can not execute said following second sub instruction.

In the microprocessor as another preferred embodiment according to the present invention, said control circuit comprises decision circuit, an exchange circuit, first selector, and a plurality of selectors. The decision circuit inputs said instructions, each of said instructions includes said plurality of sub instructions, transferred from said memory circuit and analyzes said instructions, and decides that one of said plurality of instruction execution means can execute one of said plurality of sub instructions. The exchange circuit exchanges bit strings designating said plurality of sub instructions under controlling of said decision circuit. The first selector selects one of said plurality of sub instructions under the control of said decision circuit, and outputs said selected sub instruction. Each of the plurality of selectors is connected to said first selector and each of said plurality of instruction execution means, and each selects one of said selected sub instruction and NOP instruction under controlling of said decision circuit.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 4A to FIG. 4C are explanation diagrams showing register configurations of the microprocessor shown in FIG. 1;

FIG. 5 is a diagram showing a detailed configuration of a Processor Status Word (PSW);

DESCRIPTION OF THE PREFERRED EMBODIMENTS

Other features of this invention will become apparent through the following description of preferred embodiments which are given for illustration of the invention and are not intended to be limiting thereof.

Preferred Embodiment

Figure 1:
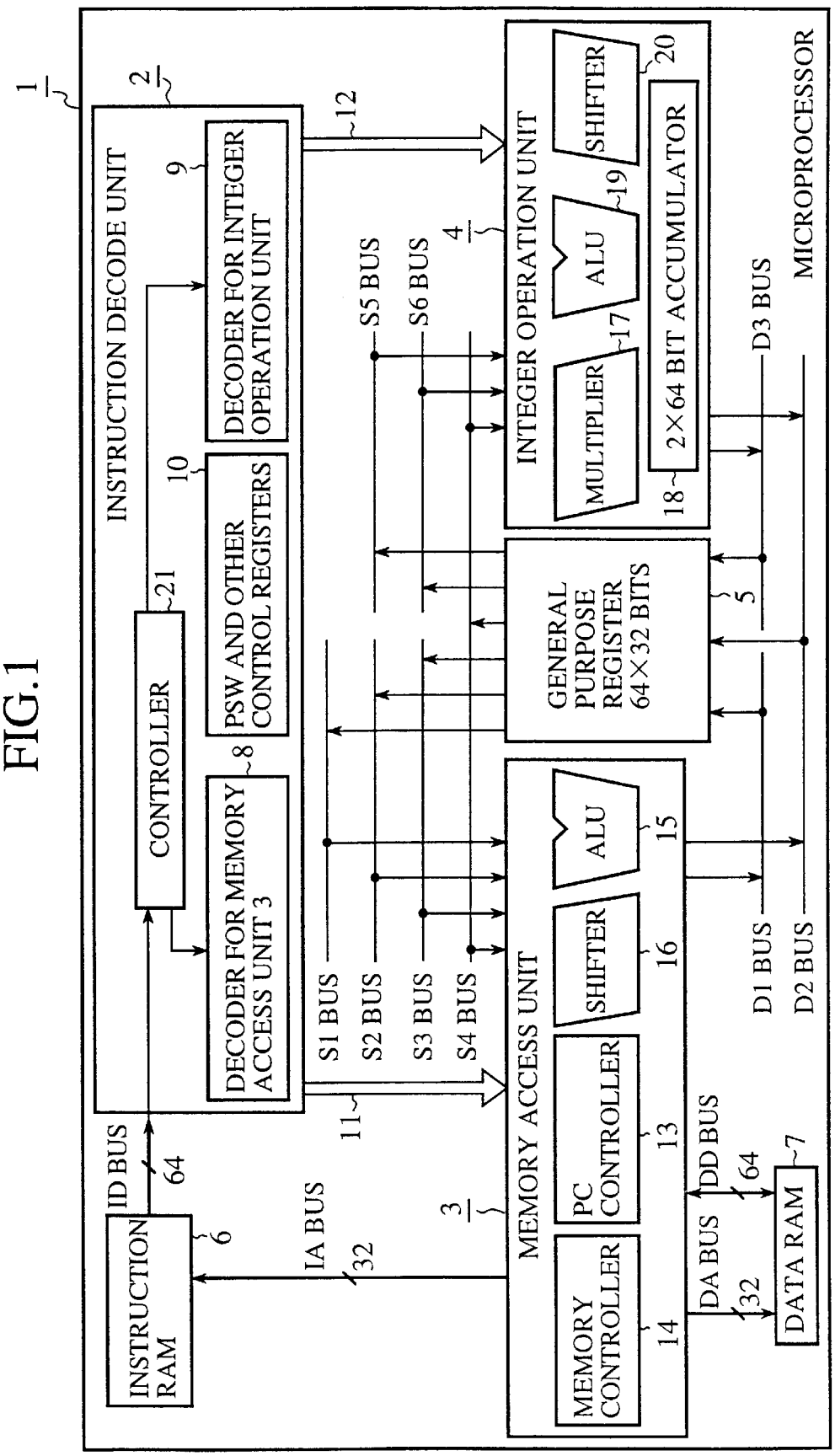
FIG. 1 is a block diagram showing an entire configuration of a microprocessor of a VLIW architecture according to the present invention.

FIG. 1 is a general view showing a configuration of a microprocessor of a VLIW architecture according to the present invention. In FIG. 1, the reference number 1 designates a 32 bit microprocessor (hereinafter referred to as a microprocessor) having a 32 bit internal bus. However, it is not limited by this configuration, for example, it is acceptable to use a 64 bit microprocessor, or other bit-number microprocessors. The reference number 2 designates an instruction decode unit, 3 denotes a memory access unit to execute instructions, and 4 indicates an integer operation unit to execute instructions. The reference number 5 designates a general purpose register group (hereinafter referred to as the general purpose register) including registers of 32 bits×64 words, 6 denotes an instruction RAM to store instructions, and 7 designates a data RAM to store data. The reference number 8 designates a decoder for the memory access unit 3, and 9 denotes a decoder for the integer operation unit 4. The reference number 10 designates a Processor Status Word (PSW) and other control registers. The reference number 21 designates a controller or a control circuit. Thus, the instruction decode unit 2 in the microprocessor 1 of the present invention comprises the decoder 8 for the memory access unit 3, the decoder 9 for the instruction decode unit 4, other control registers 10, and a control unit 21. The configuration and the operation of the control circuit 21 in the microprocessor 1 will be described later in detail with reference to FIG. 7 to FIG. 11.

As described above, the microprocessor 1 of the present invention comprises the instruction decode unit 2, the memory access unit 3, the integer operation unit 4, the general purpose register 5, the instruction RAM 6, the data RAM 7, and other components.

The instruction decode unit 2 decodes instruction codes transferred from the instruction RAM 6 through a ID bus of a 64 bit wide by using the decoder 8 for the memory access unit 3 and the decoder 9 for the integer operation unit 4. The instruction decode unit 2 generates control signals to be transferred to the memory access unit 3 through an internal bus 11 by using the decode result of the decoder 8 for the memory access unit 3 and values stored in the PSW and other control registers 10. In addition, the instruction decode unit 2 also generates control signals to be transferred to the integer operation unit 4 through an internal bus 12 based on the decode result of the decoder 9 for the integer operation unit 4 and values stored in the PSW and other control registers 10.

The memory access unit 3 comprises a program counter (PC) control section 13, a memory control section 14, ALU 15, and a shifter 16. The PC control section 13 calculates a PC value for a following instruction to be executed by adding a PC value of the current instruction that has been executed by eight (8), for example, when the following instruction to be executed does not require an effective jump operation or an effective branch instruction. When the following instruction to be executed is a jump instruction or a branch instruction, the PC control section 13 adds the PC value of the current instruction to be executed by the value of a branch displacement or performs the calculation according to an addressing mode designated by the operation.

The memory control section 14 accesses the instruction RAM 6 and gets instruction codes from the instruction RAM 6 through the IA bus of a 32 bit wide based on the PC value calculated by the PC control section 13. In addition to this, the memory control section 14 accesses the data RAM 7 through the DA bus for transferring addresses for data in the dada RAM 7 and the DD bus of a 64 bit wide for transferring data stored in the data RAM 7, and accesses data stored in the data RAM 7 to be required for executing instructions. Then, the memory control section 14 transfers the obtained data to the general purpose register 5 through the DD bus of a 64 bit wide.

The ALU 15 and the shifter 16 in the memory access unit 3 perform an arithmetic logical operation and a shift operation, respectively, by using data items of maximum 3 words transferred from the general purpose register 5 through the S1 bus of a 32-bit wide, the S2 bus of a 32 bit-wide, the S3 bus of a 32 bit-wide. The ALU 15 and the shifter 16 transfer operation results to the general purpose register 5 through the D1 bus of a 32 bit wide.

The 32 bit-wide data as the maximum 4 word data read from the general purpose register 5 are transferred to the memory access unit 3 through the S1 bus, S2 bus, S3 bus, and S4 bus. Thereby, it can be performed to execute a 2-word store instruction from the general purpose register 5 to the data RAM 7. In the execution of the 2-word instruction, for example, data stored in a third register are transferred to and stored in a memory field addressed by a word of both a first register and a second register, further, data stored in a fourth register are transferred to and stored into a memory field addressed by an address obtained by adding the address addressing the memory field in which the data in the third register are stored by a desired value. Thus, the 2 word store instruction uses two operands and calculates memory addresses, and transfers the two word data to the data RAM 7.

In addition, the memory access unit 3 transfers the operation results of a two word instruction executed by the memory access unit 3 and two word data transferred from the data RAM 7 to the general purpose register 5.

The integer operation unit 4 comprises a multiplier 17, an accumulator 18, a ALU 19, and a shifter 20. Each of the multiplier 17, the ALU 19, and the shifter 20 performs the arithmetic logical operation and. a shift operation by using a maximum 3 word data transferred from the general purpose register 5 through a S4 bus of a 32 bit wide, a S5 bus of a 32 bit wide, and a S6 bus of a 32 bit wide. Then, the integer operation unit 4 transfers the operation result to the general purpose register 5 through each of the D2 bus and the D3 bus.

The accumulator 18 accumulates or subtracts accumulately the result of the multiplication operation and keeps the accumulated result. The microprocessor 1 shown in FIG. 1 includes the accumulator 18 consisting of two accumulators of 64 bits.

The ALU 19 performs the arithmetic logical operation by using a maximum 3 word data transferred from the general purpose register 5 through the S4 bus of a 32 bit wide, the S5 bus of a 32 bit wide, and the S6 bus of a 32 bit wide.

Then, the ALU 19 transfers the operation result to the general purpose register 5 through each of the D2 bus and the D3 bus. The shifter performs the shift operation by using data transferred from the general purpose register 5 through each of the S4 bus of a 32 bit wide, the S5 bus of a 32 bit wide, and the S6 bus of a 32 bit wide.

The microprocessor 1 shown in FIG. 1 can read the maximum six kinds of register values stored in the general purpose register 5. Each of the data read from the general purpose register 5 are transferred to the S1 bus, S2 bus, S3 bus, S4 bus, S5 bus, and S6 bus, respectively. In addition to this, the microprocessor 1 can write the maximum three kinds of register values into the general purpose register 5, simultaneously.

The instruction RAM 6 is connected to a IA bus of a 32-bit wide and a ID bus of a 64-bit wide. Thereby, instruction data of a 64-bit length corresponding to an address to be transferred through the IA bus is read from the instruction RAM 6. The data RAM 7 is connected to a OA bus of a 32 bit wide and a OD bus of a 64 bit wide. Data of a 64-bit length corresponding to an address transferred through the OA bus are written into the data RAM 7 and is also read from the data RAM 7.

Figure 2A:
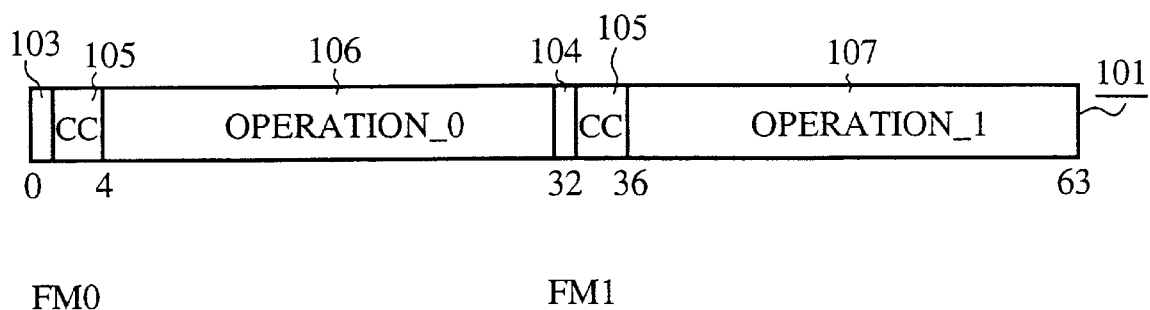
FIG. 2A and FIG. 2B are explanation diagrams showing instruction formats to be used in the microprocessor of the VLIW architecture shown in FIG. 1.
Figure 2B:
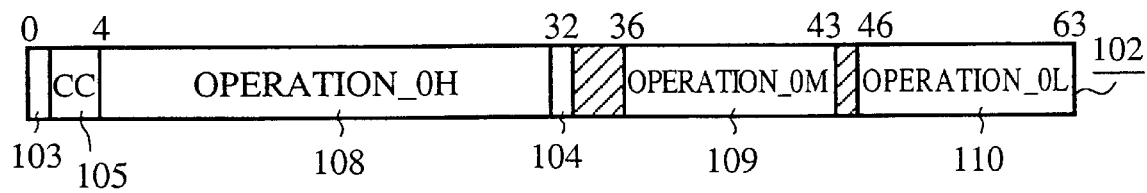

FIG. 2A and FIG. 2B are explanation diagrams showing instruction formats to be used in the microprocessor 1 of the VLIW architecture according to the present invention shown in FIG. 1. The microprocessor 1 has an instruction format 101 and an instruction format 102. The instruction format 101 is used for two operations indicated by one instruction code as shown in FIG. 2A. The instruction format 102 is used for one operation indicated by one instruction code as shown in FIG. 2B.

The instruction format 101 of two operations has a format field consisting of fields 103 and 104, two operation fields 106 and 107, and execution condition fields 105 corresponding to each of the operation fields 106 and 107. The instruction format 102 of one operation has a format field consisting of fields 103 and 104, an operation field consisting of fields 108, 109, and 117, and execution condition fields 105 corresponding to each of the operation field.

Next, a description will be given of the detailed explanation of the instruction formats 101 and 102 shown in FIG. 2A and FIG. 2B. In the following explanation, each of the format fields 103 and 104 is referred to as "FM" and a value of each of the format fields 103 and 104 is designated by using two bits.

|  | Order of Execution | |
| --- | --- | --- |
| Code: Format field | Operation 1 | Operation 2 |
| FM= 00: two instructions | First | First |
| FM= 01: two instructions | First | Second |
| FM= 10: two instructions | Second | First |
| FM= 11: one instruction | First | . . . |

In the format field FM described above, when FM=00, the instruction to be executed is a two-operation instruction. In this case, both operations, the operation_0 indicated by the operation field 106 and the operation_1 indicated by the operation field 107, are executed in parallel in the clock cycle immediately following the decoding operation. The operation_0 is executed in the memory unit 3 and the operation_1 is executed in the integer operation unit 4.

When FM=01, the instruction to be executed is a two-operation instruction. In this case, the operation_0 indicated by the operation field 106 is executed in the clock cycle immediately following the decoding operation and then operation_1 indicated by the operation field 107 is executed in a clock cycle which is delayed from the execution of the operation_0 by one cycle.

When FM=10, the instruction to be executed is a two operation instruction. In this case, the operation_1 indicated by the operation field 107 is executed in the clock cycle immediately following the decoding operation and then operation_0 indicated by the operation field 106 is executed in a clock cycle which is delayed from the execution cycle of the operation_1 by one cycle.

When FM=11, the instruction to be executed is a single operation instruction. In this case, the operation indicated by using the operation field consisting of the fields 108, 109, and 110 is executed in the clock cycle immediately following the decoding cycle.

Next, a description will be given of detailed explanation for the execution condition field (CC) 105 in each of the instruction formats 101 and 102 shown in FIG. 2A and FIG. 2B.

The execution condition field (CC) 105 has the following conditions.

| Code (CC) | Execution Condition |
| --- | --- |
| 000: | Always |
| 001: | F0= True and F1= Does not matter |
| 010: | F0= False and F1= Does not matter |
| 011: | F0= Does not matter and F1= True |
| 100: | F0= Does not matter and F1= False |
| 101: | F0= True and F1= True |
| 110: | F0= True and F1= False |
| 111: | Reserved |

The execution condition field (CC) 105 of the 3-bit field determines whether the execution of the operation_0 designated by each of the operation fields 106 and 107, the execution of the operation_1, and the operations designated by the operation fields 108, 109, and 110 are active or inactive depended on the values in the status flags F0 and F2 in the microprocessor 1.

The operation results are written into the registers, the memories, and the flags only when the operation is active. When an operation is inactive, the operation results are not written into the registers, the memories, and the flags, that is, this means that the execution result of a NOP (No OPeration) instruction is written into the registers, the memories, and the flags.

When the value CC of the execution condition field 105 is zero (CC=000), the operation is always active regardless of values of the operation control flags F0 and F1.

When CC=001, the operation is active only when the execution control flag F0=True. In this case, the state of the execution control flag F1 does not matter.

When CC=010, the operation is active only when F0=False. In this case, the status of the F1 flag does not matter.

When CC=011, the operation is active only when F1=True. In this case, the status of the F0 flag does not matter.

When CC=100, the operation is active only when F1=False. In this case, the status of the F0 flag does not matter.

When CC=101, the operation is active only when F0=True and F1=True.

When CC=110, the operation is active only when F0=True and F1=False.

When CC=111, the operation is undefined. The value CC=111 is not used in any instruction.

Figure 3:
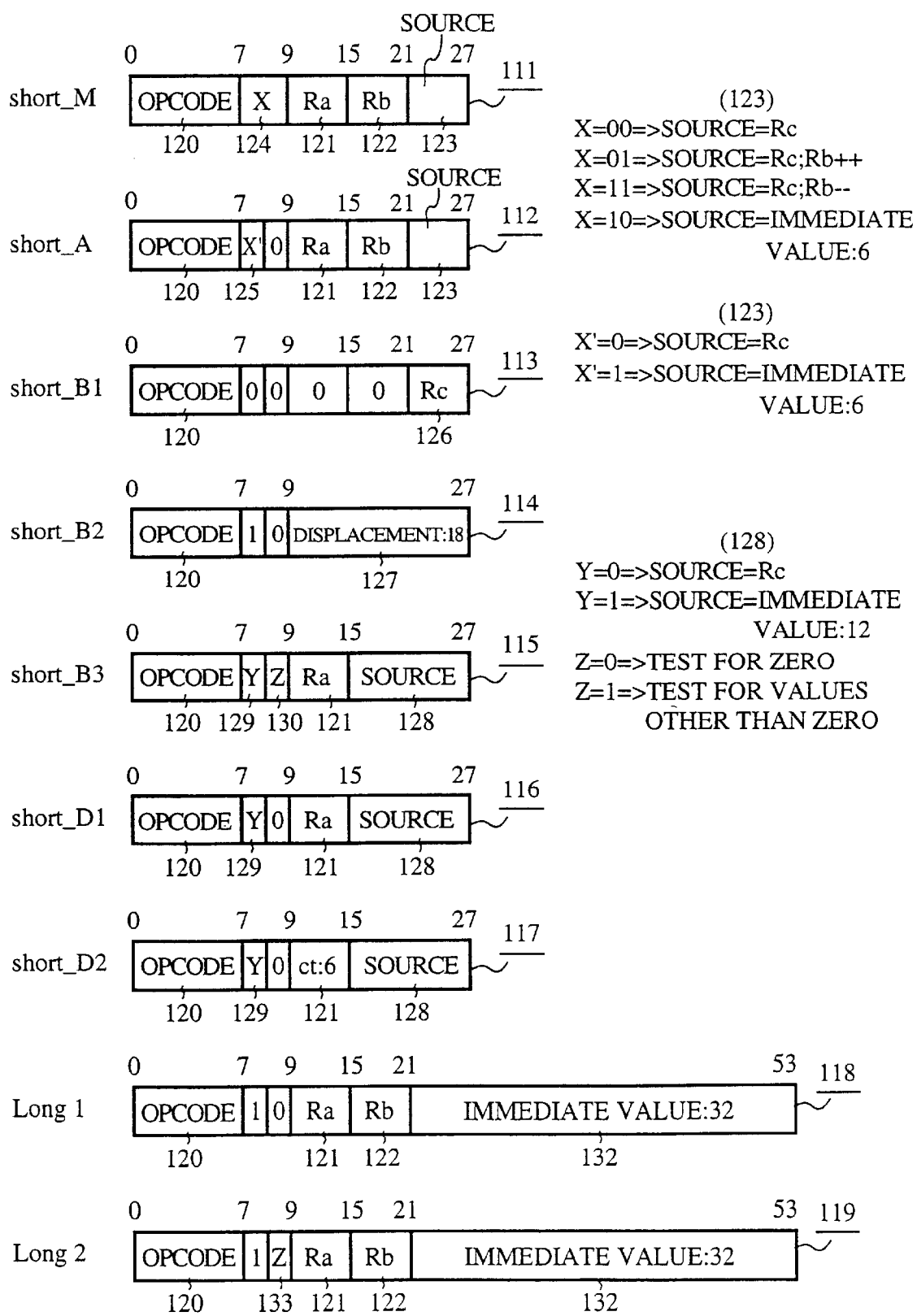
FIG. 3 is an explanation diagram showing a detailed configuration of each of operation fields as a short type and a long type;s

FIG. 3 is a diagram that gives a detailed explanation of the configuration of each of the operation fields:

Operation fields 106 and 107 of a 28 bit short type in the instruction format 101 shown in FIG. 2A; and An operation field of a 54 bit long type consisting of the fields 108, 109, and 110 in the instruction format 102 shown in FIG. 2B.

In FIG. 3, each of the short formats 111, 112, 113, 114, 115, 116, and 117 comprises the 28-bit short type operation field 106 or 107. Each of the formats 118 and 119 comprises the 54 bit long-length type operation fields 108, 109 and 110.

As shown in FIG. 3, Format 111 (Short M) consists of field 120 (an 8-bit opcode field) designating the type of operation, the two fields 121 and 122 (two 6-bit register specifier fields Ra and Rb) each designates a register number, field 123 (a 6-bit register specifier field) for specifying a register number or an immediate value of a 6 bit long, and field 124 (a 2-bit operand identifier X) for indicating the type of data stored in the field 123. As shown in FIG. 3, when the field 124 as the operand identifier X indicates 00, 01, or 11, the field 123 indicates the register number, and the field 123 designates an immediate value when the field 124 is 10.

The format 111 (Short_M) is used for load-store instructions such as memory access operations with register indirect addressing modes.

Format 112 (Short_A) consists of field 120 (an 8-bit opcode field) designating the type of operation, the two fields 121 and 122 (two 6-bit register specifier fields Ra and Rb) each designates a register number, field 123 (a 6-bit register specifier field) for indicating a register number or an immediate value of a 6-bit long, and field 125 (a 1-bit operand identifier Y) for indicating the type of data stored in the field 123. As shown in FIG. 3, the field 123 indicates a register number when the value X' of the field 125 is 0, and the field 123 indicates an immediate value when the value X' of the field 125 is 1. This format 112 is used for instructions such as arithmetic operations, logic operations, shift operations, bit operations and so on.

Format 113 (Short_B1) shown in FIG. 3 consists of field 120 (a 8-bit opcode field) designating the type of operation and field 126 (a 6-bit register specifier Rc field) for specifying a register number. This format 113 is used for jump instructions and branch instructions with an address specified in a register (Rc).

Format 114 (Short_B2) shown in FIG. 3 consists of field 120 (an 8-bit opcode field) designating the type of operation and field 127 of an 18-bit displacement. This format 114 is used for jump instructions and branch instructions with an immediate 18-bit displacement.

Format 115 (Short_B3) shown in FIG. 3 consists of field 120 (an 8-bit opcode field) for designating the type of operation, field 121 (a 6-bit register specifier Ra field) for designating a register number, field 128 for designating a register number or a 12-bit immediate value, and field 129 for indicating whether the field 128 stores a register number or an immediate value, and field 130 for indicating whether a conditional jump operation or a conditional branch operation is performed based on the contents (zero decision) of the register specified in field 121. This format 115 is used for conditional jump instructions and conditional branch instructions.

Format 116 (Short_D1) shown in FIG. 3 consists of field 120 (an 8-bit opcode field) for designating the type of operation, field 121 (a 6-bit register specifier Ra field) for designating a register number, field 128 for designating a register number or a 12-bit immediate value, and field 129 (a 1-bit operand identifier Y field) for specifying whether the content in the field 128 is a register number or an immediate value. This format 116 is used for conditional jump instructions, conditional branch instructions, and repeat instructions.

Format 117 (Short_D2) shown in FIG. 3 consists of field 120 (an 8-bit opcode field) for designating the type of operation, field 128 for designating a register number or a 12-bit immediate value, field 129 (a 1-bit operand identifier Y field) for indicating whether the content in field 128 is a register number or an immediate value, and field 131 (a 6-bit displacement field ct:6) used for delayed instructions. This format 117 is used for delayed jump instructions, delayed branch instructions, and repeat instructions.

Format 118 (Long 1) consists of field 120 for designating the type of operation, the two fields 121 and 122 for designating register numbers, and field 132 for designating a 32-bit immediate value. This format 118 is used for all instructions that take a 32-bit immediate operand such as complicated arithmetic operations, arithmetic operations using a large immediate value, memory access operation of register relative indirect addressing with a large displacement, branch instructions with a large displacement and jump instructions to absolute addresses.

Format 119 (Long 2) shown in FIG. 3 consists of field 120 (an 8-bit opcode field) for designating the type of operation, two fields 121 and 122 for designating register numbers, field 132 for designating a 32 bit immediate value, and field 133 for indicating either a conditional jump operation or a conditional branch operation is performed based on the content in fields 132 and 133 of a zero decision. This format 119 is used for condition jump instructions and condition branch instructions with a large branch displacement.

FIG. 4A, FIG. 4B, and FIG. 4C are explanation diagrams showing the configuration of registers incorporated in the microprocessor 1 according to the present invention shown in FIG. 1.

The microprocessor 1 shown in FIG. 1 comprises the general purpose register 5 including sixty-four 32-bit general purpose registers shown in FIG. 4A, twelve control registers 150 shown in FIG. 4B, and two accumulators 18 shown in FIG. 4C. The value in the general purpose register (R0) 140 in the general purpose register 5 is always zero. Therefore writing data into the general purpose register (R0) 140 has no effect. The general purpose register (R62) is a link register into which an address indicating a return target from a subroutine is stored.

The general purpose register (R63) is the stack pointer (SPU, SPI) operating, which serves as the user stack pointer (SPU) 141 or the interrupt stack pointer (SPI) 142 depending on the value of the SM field in the processor status word (PSW) 10.

The control registers 150 comprise a program counter 151, the PSW 10, and other control registers and various dedicated registers.

In several operations that use format 112 shown in FIG. 3, the upper 16 bits and the lower 16 bits in each of the 64 general purpose registers 5 can be used and accessed independently.

FIG. 5 is a diagram showing detailed contents of the processor status word (PSW) 10 in the microprocessor 1 according to the present invention shown in FIG. 1.

Figure 11:
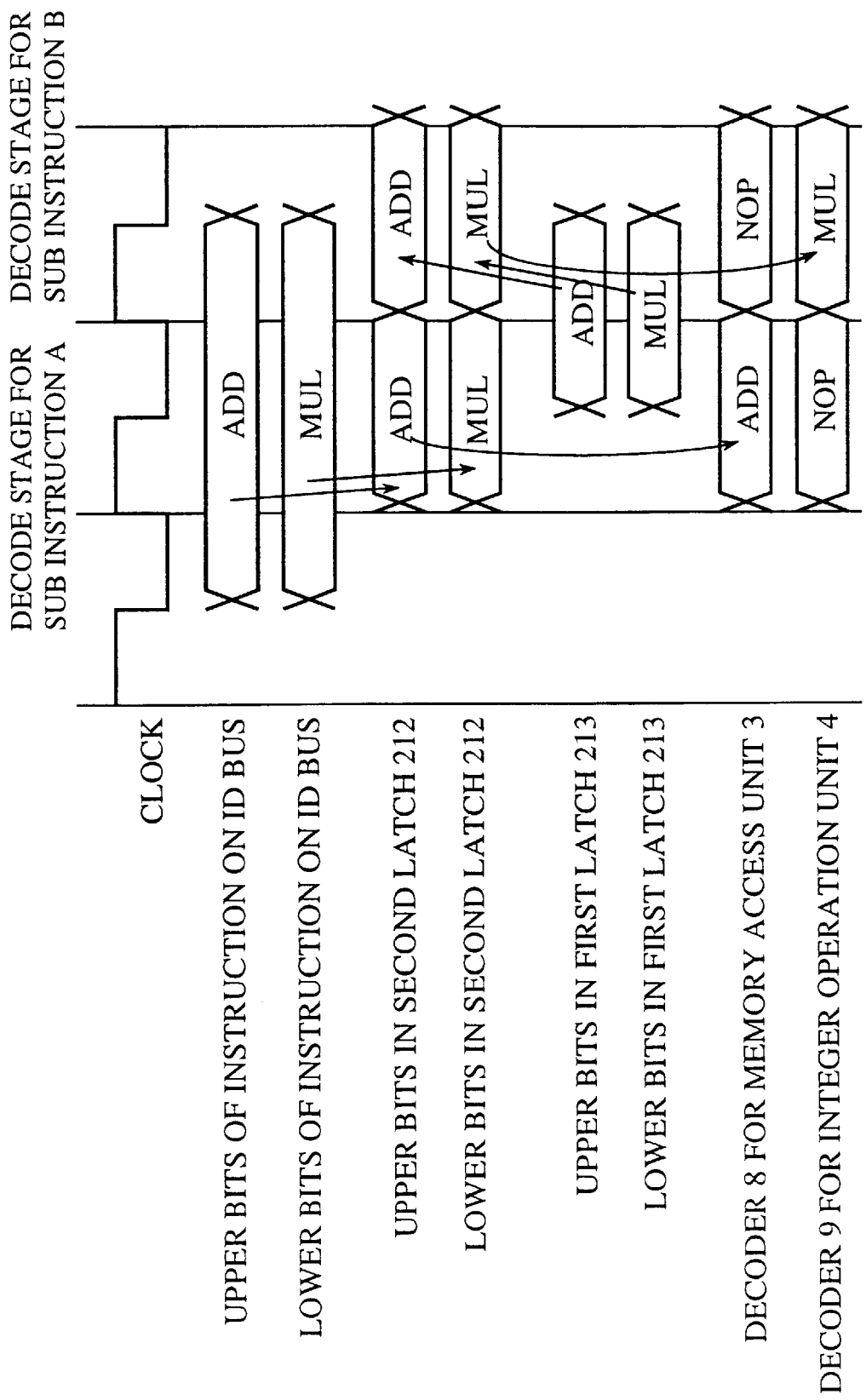
FIG. 11 is a timing chart showing the operation of the pipeline shown in FIG. 10.

As shown in FIG. 11, the upper 16 bits 170 in the PSW 10 includes the SM field 171 for switching the stack pointer, the EA field 172 for showing a detection of a software debugger trap (SDBT), the DB field 173 for enabling or disabling the SDBT, the IE field 174 for enabling or disabling interrupts, the RP field 175 for activating a repeat operation, and the MD field 176 for enabling or disabling of modulo addressing.

The lower 16 bit field is a flag field 180. The flag field 180 includes 8 flags. The F0 flag field 181 and F1 flag 182 (execution control flags) are used in conjunction to the CC bits to decide whether each operation being executed by the CPU is active or inactive. The value of each flag is changed depending on results of comparison operations and flag logical operations, according to initialization operations for these flags, or by writing a register value into the flag field 180 in flag writing operations. Contents in the flag field 180 can be read out by flag-value readout operation.

Each flag in the flag fields 170 and 180 is defined as follows:

SM=0: Stack mode 0→SPU is used
SM=1: Stack mode 1→SPU is used
EA=0: SDBT is not detected
EA=1: SDBT is detected
DB=0: SDBT is not accepted
DB=1: SDBT is accepted
IE=0: Interrupts are masked
IE=1: Interrupts are accepted
RP=0: A block repeat is inactive
RP=1: A block repeat is active
MD=0: Modulo addressing is disable
MD=1: Modulo addressing is enable
F0: General purpose flag (execution control flag)
F1: General purpose flag (execution control flag)
F2: General purpose flag
F3: General purpose flag
F4(S): Saturation operation flag
F5(V): Overflow flag
F6(VA): Accumulated overflow flag
F7(C): carry/Borrow flag Hereinafter, the instruction list used in the microprocessor 1 according to the present invention shown in FIG. 1 will be described.

A. Microprocessor Controlling Function Instructions

A-1. Load Store instructions

Figure 6:
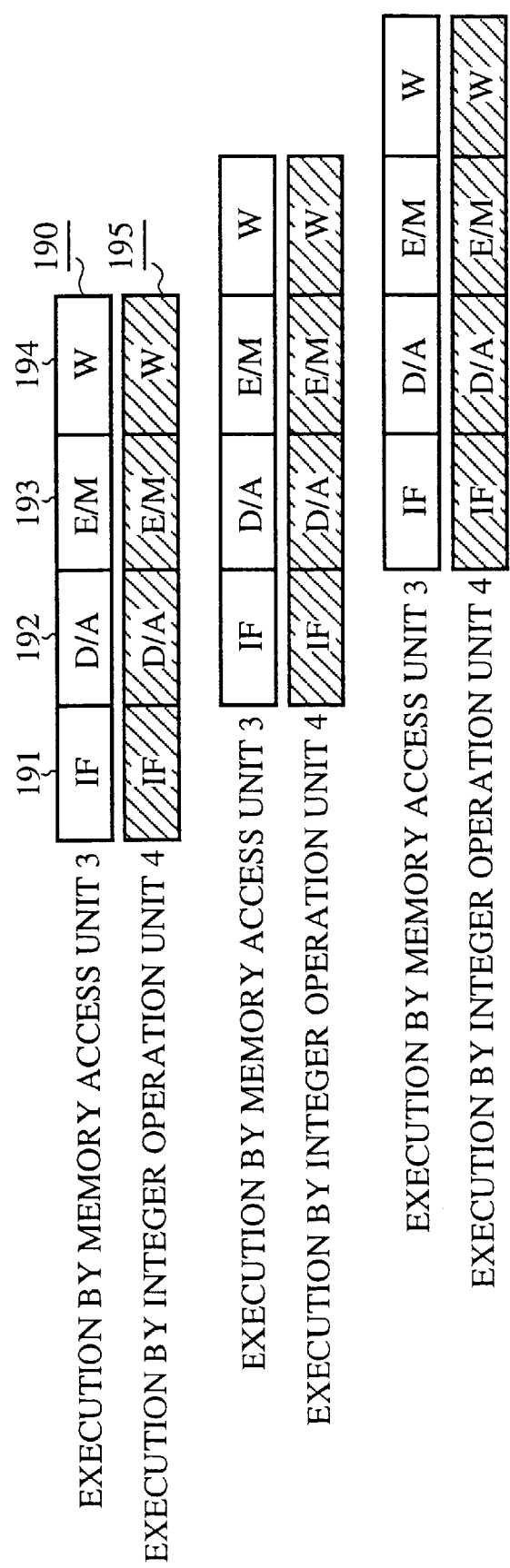
FIG. 6 is an explanation diagram showing a pipeline operation performed by the microprocessor shown in FIG. 1.

LDB: Load one byte to a register with sign extension
LDBU: Load one byte to a register with zero extension
LDH: Load one half-word to a register with sign extension
LDHH: Load one half-word to a register high
LDHU: Load one half-word to a register with zero extension
LDW: Load one word to a register
LD2W: Load two words to registers
LD4BH: Load four bytes to four half-words in two registers with sign extension
LD4BHU: Load four bytes to four half-words in two registers with zero extension
LD2H: Load two half-words to two words in two registers with sign extension STB: Store one byte from a register
STH: Store one half-word from a register
STHH: Store one half-word from a register high
STW: Store one word from a register
ST2W: Store two words from two registers
ST4HB: Store four bytes from four half-words from two registers
ST2H: Store two half-words from two registers
MODDEC: Decrement a register value by a 5-bit immediate value
MODINC: Increment a register value by a 5-bit immediate value A-2. Transfer instructions MVFSYS: Move a control register to a general purpose register
MVTSYS Move a general purpose register to a control register
MVFACC: Move a word from an accumulator
MVTACC: Move two general purpose registers to an accumulator A-3. Compare instructions CMPcc Compare
cc=EQ(equal), NE (not equal), GT(greater than), GE(greater than or equal), LT(less than), LE(less than or equal), PS(both positive), NG(both negative)
CMPcc: Compare unsigned
cc=GT, GE, LT, LE A-4. Maximum/Minimum instructions
reserved A-5. Arithmetic operation instructions ABS: Absolute
ADD: Add
ADDC: Add with carry
ADDHppp: Add half-word
ppp=LLL(register lower, register lower, register lower), LLH(register lower, register lower, register higher), LHL, LHH, HLL, HLH, HHL, HHH
ADDS: Add register Rb with the sign of the third operand
ADDS2H Add sign to two half-words
ADD2H Add two pairs of half-words
AVG Average with rounding towards positive infinity
AVG2H: Average two pairs of half-words with rounding towards positive infinity
JOINpp: Join two half-words
pp=LL, LH, HL, HH
SUB: Subtract
SUBB: Subtract with borrow
SUBHppp: Subtract half-word
ppp=LLL, LLH, LHL, LHH, HLL, HLH, HHL, HHH
SUB2H: Subtract two pairs of half-words A-6. Logical operation instructions AND: bitwise logical AND
OR: bitwise logical OR
NOT: bitwise logical NOT
XOR: bitwise logical exclusive OR
ANDFG: logical AND flags
ORFG: logical OR flags
NOTFG: logical NOT a flag
XORFG: logical exclusive OR flags A-7. Shift operation instructions
  SRA: Shift right arithmetic
  SRA2H: Shift right arithmetic two half-words
  SRC: Shift right concatenated registers
  SRL: Shift right logical
  SRL2H: Shift right logical two half-words
  R0T: Rotate right
  R0T2H: Rotate right two half-words
A-8. Bit operation instructions
  BCLR Clear a bit
  BNOT: Invert a bit
  BSET: Set a bit
  BTST: Test a bit
A-9. Branch instructions
  BRA: Branch
  BRATZR: Branch if zero
  BRATNZ: Branch if not zero
  BSR: Branch to subroutine
  BSRTZR: Branch to subroutine if zero
  BSRTNZ: Branch to subroutine if not zero
  JMP: Jump
  JMPTZR: Jump if zero
  JMPTNZ: Jump if not zero
  JSR: Jump to subroutine
  JSRTZR: Jump to subroutine if zero
  JSRTNZ: Jump to subroutine if not zero
  NOP: No Operation
A-10. OS-related instructions
  TRAP: Trap
  REIT: Return from exception, interrupts and traps
B. DSP Function Instructions
B-1. Arithmetic operation instructions
  MUL: Multiply
  MULX: Multiply with extended precision
  MULXS Multiply and shift to the right by one with extended precision
  MULX2H: Multiply two pairs of half-words with extended precision
  MULHXpp: Multiply two half-words with extended precision
    pp=LL, LH, HL, HH
  MUL2H: Multiply two pairs of half-words
  MACa: Multiply and add
    a (designates which accumulator to use)=0,1
  MACSa: Multiply, shift to the right by one and add
    a=0, 1
  MSUBa: Multiply and subtract
    a=0, 1
  MSUBSa Multiply, shift to the right by one and subtract
    a=0, 1
Saturation Operation Instructions
  SAT Saturate
  SATHH Saturate word operand into high half-word
  SATHL Saturate word operand into low half-word
  SATZ Saturate into positive number
  SATZ2H Saturate two half-words into positive number
  SAT2H Saturate two half-word operands B-2. Repeat instructions
  REPEAT: Repeat a block of instructions
  REPEAT1: Repeat a block of instructions with immediate repeat count FIG. 6 is an explanation diagram showing a pipeline operation of the parallel execution (FM=00) for two instructions performed by the microprocessor according to the present invention shown in FIG. 1. Each of the pipeline 190 and 195 consists of an instruction fetch (IF) stage 191, a decode/address (D/A) operation stage 192, an execution/memory access (E/M) stage 193, and a write back (WB) stage 194.

When two instructions are executed in parallel, the pipeline 190 by the memory access unit 3 and the pipeline 195 (see the slant line shown in FIG. 6) by the integer operation unit 4 are executed in parallel.

Figure 7:
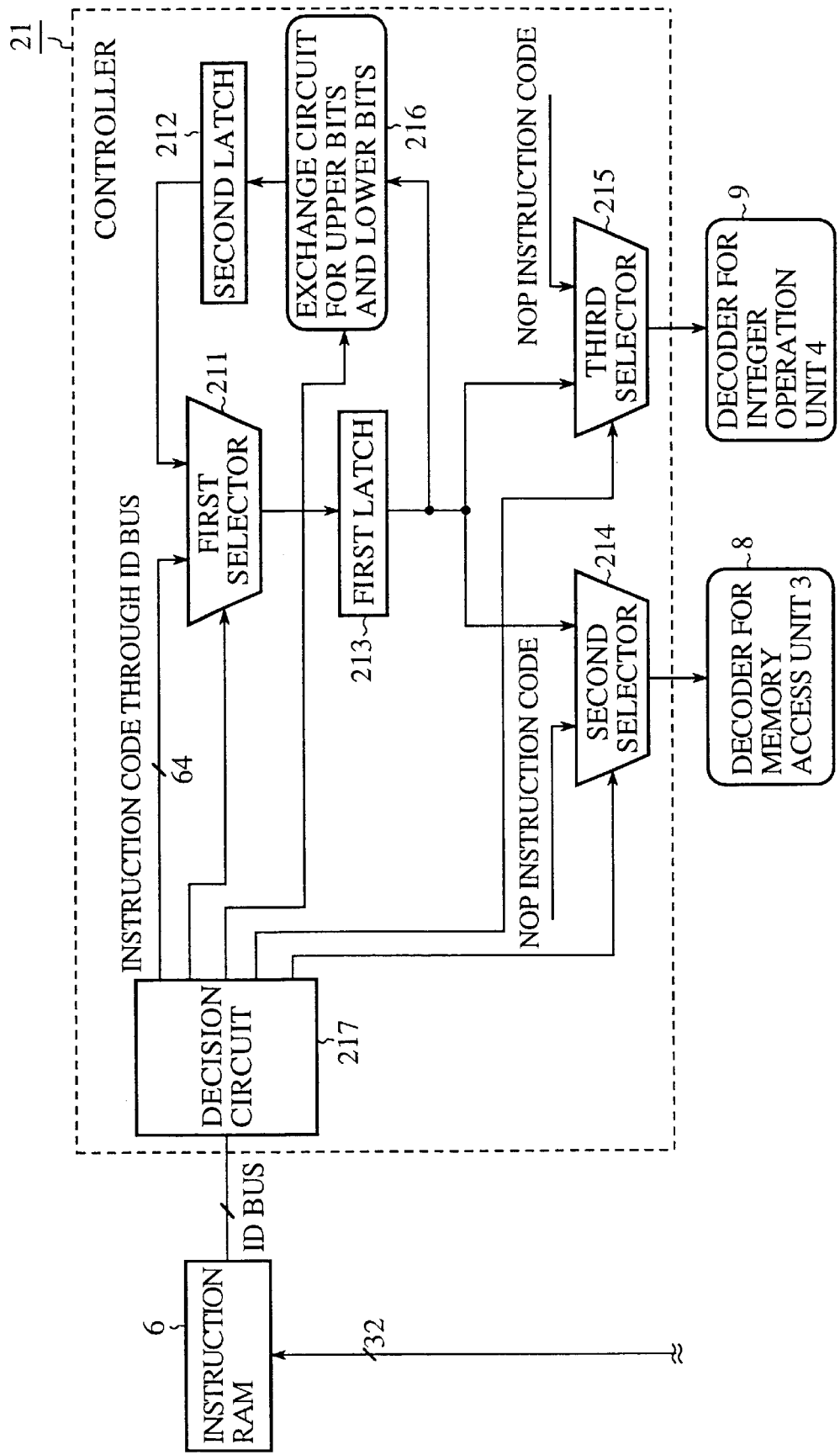
FIG. 7 is a diagram showing a configuration of a control circuit incorporated in an instruction decode unit to control the operation of pipeline during the execution of a sequential instruction by the microprocessor shown in FIG. 1.

FIG. 7 is a diagram showing a configuration of the control circuit 21 incorporated in an instruction decode unit 2 to control the operation of pipeline during the execution of a sequential instruction by the microprocessor shown in FIG. 1. In FIG. 7, the reference number 217 designates a decision circuit for inputting an instruction code outputted from the instruction RAM 6 through the ID bus of a 64 bit wide, for generating control signals to control the operation of selectors 211, 214, and 215, and an exchange circuit 216 that exchanges the upper bits and the lower bits, and for outputting the control signals. The reference number 211 designates the first selector, 214 denotes the second selector, and 215 indicates the third selector. The reference number 211 designates the first selector, 214 denotes the second selector, and 215 indicates the third selector. The reference number 213 designates a first latch, 212 denotes a second latch, and 216 indicates the exchange circuit that exchanges the upper bits and the lower bits in the output from the first latch 213 according to the control signal transferred from the decision circuit 217.

The first selector 211 selects one of the instruction code that has been read from the instruction RAM 6 through the ID bus and the output data from the second latch 212 according to the control signal transferred from the decision circuit 217. The second selector 214 selects one of the output data from the first latch 213 and the NOP instruction code according to the control signal transferred from the decision circuit 217. The output data from the second selector 214 are transferred to the memory access unit 3 through the decoder 8. The third selector selects one of the output data from the first latch 213 and the NOP instruction code according to the control signal transferred from the decision circuit 217. The output data from the third selector 215 are transferred to the integer operation unit 4 through the decoder 9. Other components such as the decoder 8 and the 9 and so on are the same as those of the microprocessor 1 shown in FIG. 1, therefore the same reference numbers are used for the same components and the explanation for them is omitted here.

Figure 8:
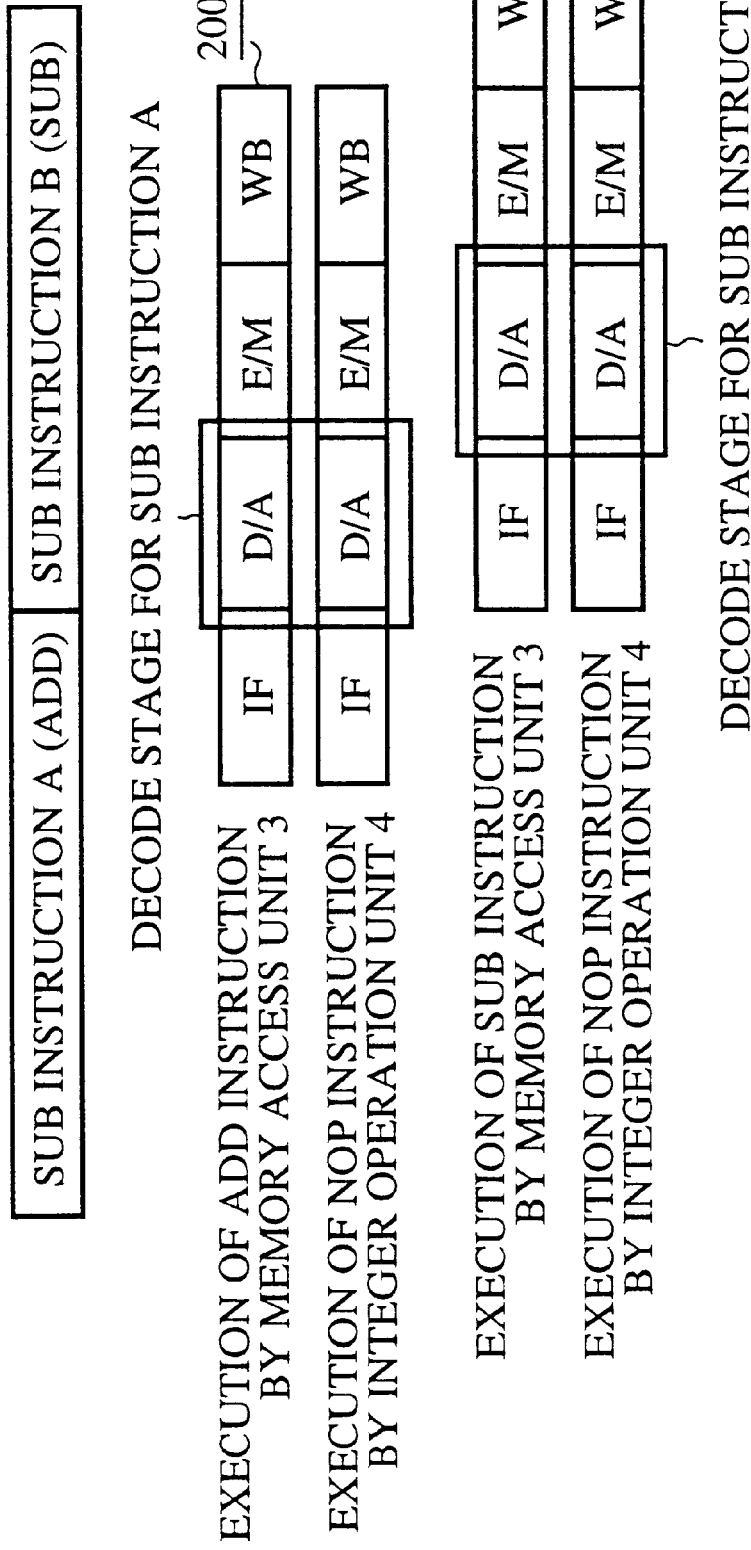
FIG. 8 is an explanation diagram showing the operation of pipeline during the execution of a sequential instruction by the microprocessor shown in FIG. 1.

Next, a description will be given of the operation of the pipeline during the execution of the sequential instruction by the microprocessor 1 shown in FIG. 1. In FIG. 8, the reference number 200 designates each stage of the pipeline.

The pipeline 200 consists of an instruction fetch (IF) stage, a decode/ address (D/A) operation stage, an execution/memory access (E/M) stage, and a write back (WB) stage.

In the pipeline shown in FIG. 8, when FM=01 in the instruction format 101 shown in FIG. 2A, the sub instruction A is an ADD instruction and the sub instruction B is a SUB instruction to be executed by the memory access unit 3. When FM=01, the sub instruction A that is executed at first is executed by the memory access unit 3. The sub instruction B is secondly executed is always executed by the memory access unit 3 that has executed the sub instruction A because the control circuit 21 decides that the memory access unit 3 is capable of executing the sub instruction B even if the integer operation unit 4 can also execute the sub instruction B.

Figure 9:
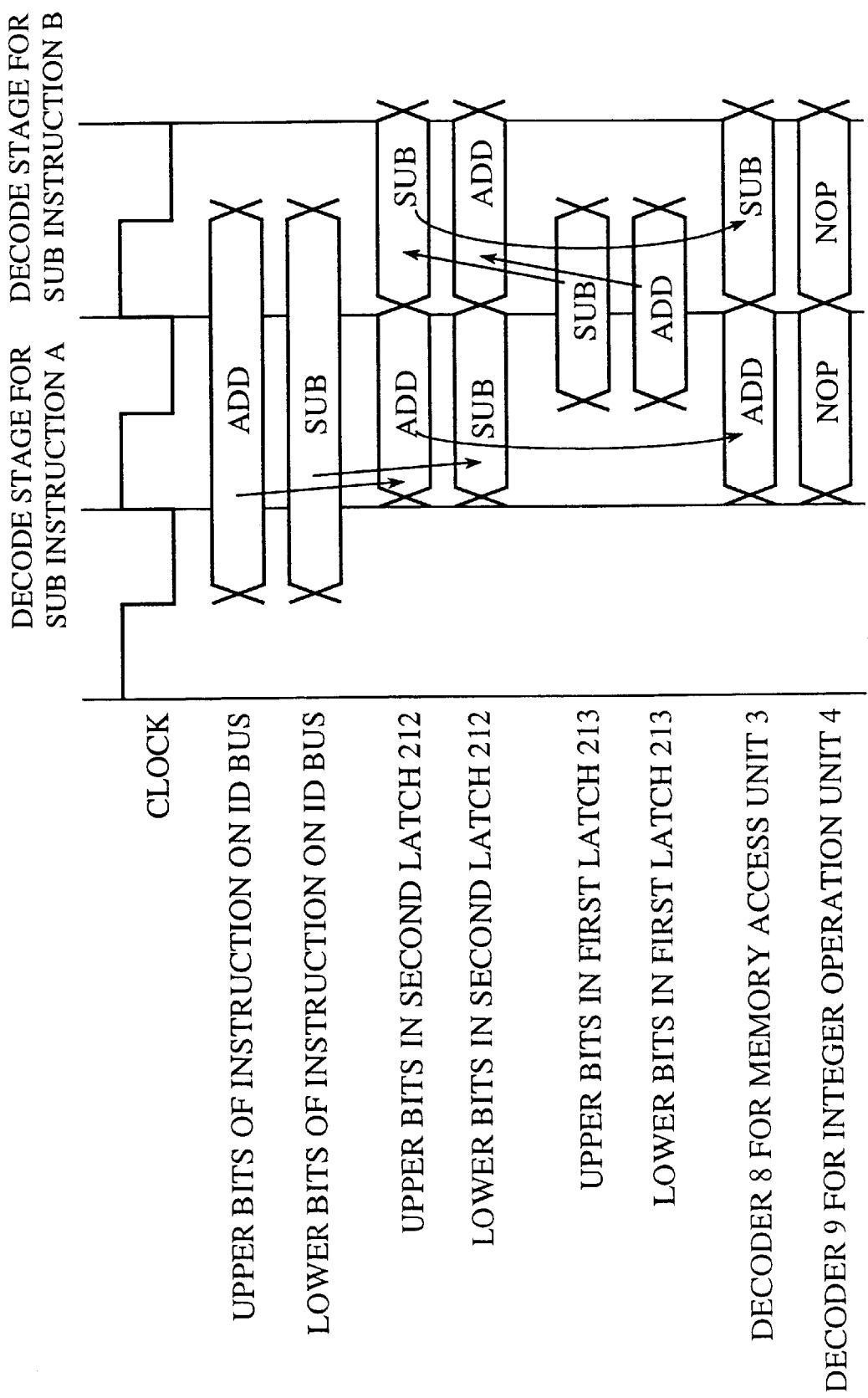
FIG. 9 is a timing chart showing the operation of the pipeline shown in FIG. 8.

FIG. 9 is a timing chart showing the operation of the pipeline shown in FIG. 8. This timing chart corresponds to the execution of the sequential instruction in the pipeline shown in FIG. 8.

First, a description will be given of the operation in the decode stage for the sub instruction A to be executed based on the control by the control circuit 21.

The upper bits (32 bits) and the lower bits (32 bits) in the instruction code transferred from the instruction RAM 6 through the ID bus of a 64 bit wide corresponds to the code of the ADD instruction and the code of the SUB instruction, respectively.

According to the control signal transferred from the decision circuit 217 in the control circuit 21 to the first selector 211, the upper bits and the lower bits of the data that are output from the first latch (this first latch 213 latches the data from the first selector 211) correspond to the code of the ADD instruction and the code of the SUB instruction, respectively.

Next, the exchange circuit 216 exchanges the upper bits (32 bits) and the lower bits (32 bits) to each other according to the control signal transferred from the decision circuit 217. Thereby, the upper bits and the lower bits in the data outputted from the second latch 212 according to the control signal from the decision circuit 217 correspond to the SUB instruction and the ADD instruction, respectively. Accordingly, the upper bits and the lower bits in the output data from the first latch 213 corresponds to the code of the SUB instruction and the code of the ADD instruction, respectively.

Next, the second selector 214 selects the output from the first latch 213 according to the control signal from the decision circuit 217 and then outputs the selected one to the decoder 8 for the memory access unit 3. The decoder 8 receives and decodes the code of the ADD instruction from the second selector 214. Thereby, the memory access unit 3 executes the code of the ADD instruction from the second selector 214 through the decoder 8.

On the other hand, the third selector 215 selects the code of the NOP instruction according to the control signal from the decision circuit 217 and then outputs the selected one to the decoder 9 for the integer operation unit 4. The decoder 9 receives and decodes the code of the NOP instruction transferred from the third selector 215. Thereby, the integer operation unit 4 executes the NOP instruction from the third selector 215 through the decoder 9.

Next, a description will be given of the operation in the decode stage for the sub instruction B.

The first selector 211 selects the data for the second latch 212 according to the control signal from the decision circuit 217, and the upper bits and the lower bits of the data that are outputted from the first latch 213 correspond to the code of the SUB instruction and the code of the ADD instruction, respectively.

Next, the second selector 214 selects the code of the SUB instruction from the first latch 213 according to the control signal from the decision circuit 217 and then outputs the selected one to the decoder 8 for the memory access unit 3. The decoder 8 receives and decodes the code of the SUB instruction from the second selector 214. Thereby, the memory access unit 3 executes the code of the SUB instruction from the second selector 214 through the decoder 8.

On the other hand, the third selector 215 selects the code of the NOP instruction according to the control signal from the decision circuit 217 and then outputs the selected one to the decoder 9 for the integer operation unit 4. The decoder 9 receives and decodes the code of the NOP instruction from the third selector 215. Thereby, the integer operation unit 4 executes the NOP instruction from the third selector 215 through the decoder 9.

Figure 10:
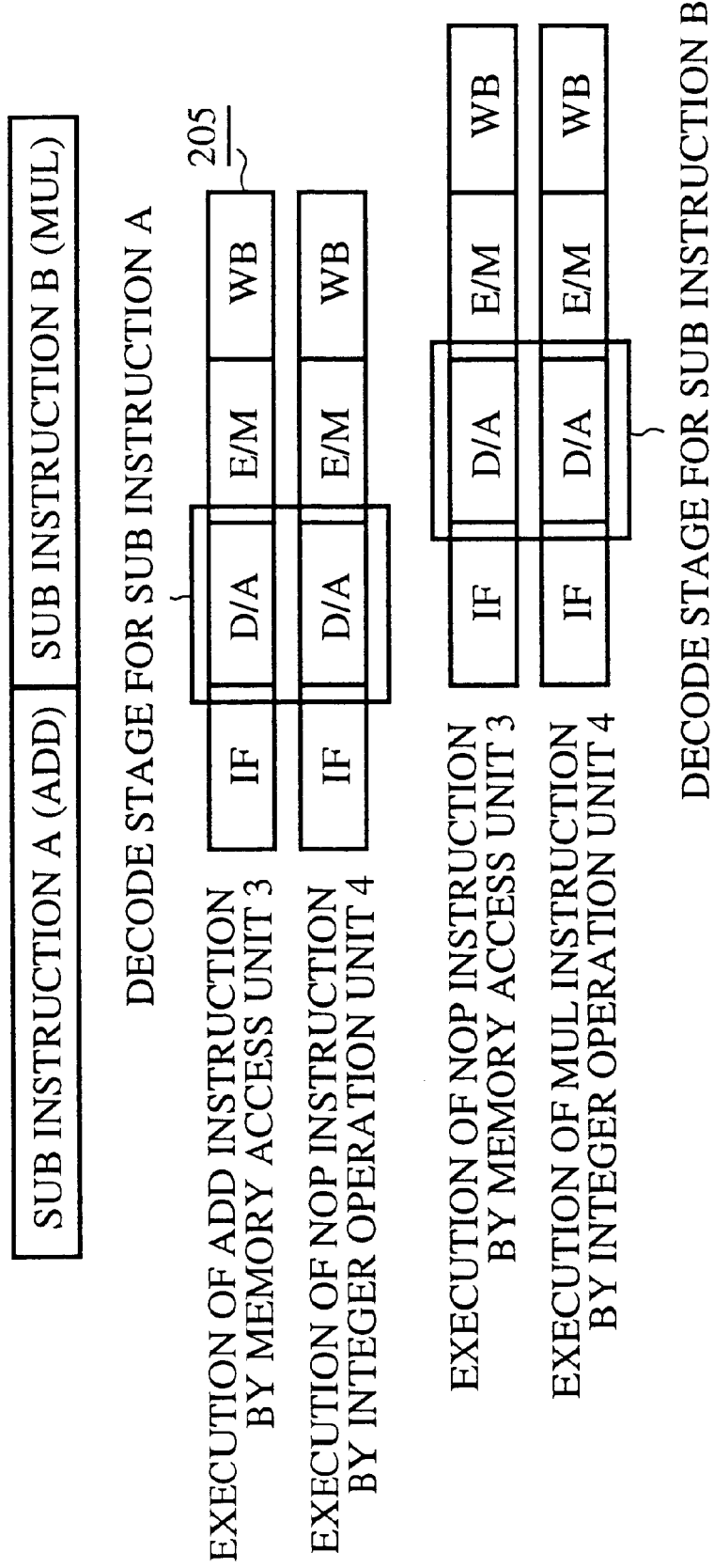
FIG. 10 is an explanation diagram showing the operation of another pipeline during the execution of a sequential instruction by the microprocessor shown in FIG. 1.

FIG. 10 is an explanation diagram showing the operation of another pipeline during the execution of the sequential instruction by the microprocessor 1 shown in FIG. 1. In FIG. 10, the reference number 205 designates each stage in pipeline.

Like the pipeline 200, the pipeline 205 consists of an instruction fetch (IF) stage, a decode/address (D/A) operation stage, an execution/memory access (E/M) stage, and a write back (WB) stage.

In the pipeline shown in FIG. 10, when FM=01 in the instruction format 101 shown in FIG. 2A, the sub instruction A is an ADD instruction and the sub instruction B is a MUL instruction. The MUL instruction can be executed only by the integer operation unit 4.

When FM=01, the sub instruction A to be executed firstly is executed by the memory access unit 3. Following this, the MUL instruction as the sub instruction B is executed only by the integer operation unit 4 according to the control of the decision circuit 217 because it is impossible for the memory access unit 3 to execute the sub instruction B, namely, it is possible to execute the sub instruction B only by the integer operation unit 4.

FIG. 11 is a timing chart showing the operation of the pipeline shown in FIG. 10. This timing chart corresponds to the execution of the sequential instruction in the pipeline shown in FIG. 10.

First, a description will be given of the operation in the decode stage for the sub instruction A to be executed based on the control by the control circuit 21.

The upper bits (32 bits) and the lower bits (32 bits) in the instruction code transferred from the instruction RAM 6 through the ID bus of a 64 bit wide corresponds to the code of the ADD instruction and the code of the MUL instruction, respectively. According to the control signal transferred from the decision circuit 217 in the control circuit 21, the upper bits and the lower bits of the data that are output from the first latch 213, (this first latch 213 latches the data from the first selector 211), correspond to the code of the ADD instruction and the code of the MUL instruction, respectively.

Next, in the case of the pipeline shown in FIG. 10, the exchange circuit 216 does not exchange the upper bits (32 bits) and the lower bits (32 bits) according to the control signal transferred from the decision circuit 217. Thereby, according to the control signal from the decision circuit 217, the upper bits and the lower bits in the data outputted from the second latch 212 correspond to the ADD instruction and the MUL instruction, respectively. Accordingly, the upper bits and the lower bits in the output data from the first latch 213 correspond to the code of the ADD instruction and the code of the MUL instruction, respectively.

Next, the second selector 214 selects the output from the first latch 213 according to the control signal from the decision circuit 217 and then outputs the selected one to the decoder 8 for the memory access unit 3. The decoder 8 receives and decodes the code of the ADD instruction from the second selector 214. Thereby, the memory access unit 3 executes the code of the ADD instruction from the second selector 214 through the decoder 8.

On the other hand, the third selector 215 selects the code of the NOP instruction according to the control signal from the decision circuit 217 and then outputs the selected one to the decoder 9 for the integer operation unit 4. The decoder 9 receives and decodes the code of the NOP instruction from the third selector 215. Thereby, the integer operation unit 4 executes the NOP instruction from the third selector 215 through the decoder 9.

Next, a description will be given of the operation in the decode stage for the sub instruction B.

The first selector 211 selects the data for the second latch 212 according to the control signal from the decision circuit 217, and the upper bits and the lower bits of the data that are outputted from the first latch 213 correspond to the code of the ADD instruction and the code of the MUL instruction, respectively.

Next, the second selector 214 selects the code of the NOP instruction according to the control signal from the decision circuit 217 and then outputs the selected one to the decoder for the memory access unit 3. The decoder 8 receives and decodes the code of the NOP instruction from the second selector 214. Thereby, the memory access unit 3 executes the code of the NOP instruction from the second selector 214 through the decoder 8.

On the other hand, the third selector 215 selects the code of the MUL instruction according to the control signal from the decision circuit 217 and then outputs the selected one to the decoder 9 for the integer operation unit 4. The decoder 9 receives and decodes the code of the MUL instruction from the third selector 215. Thereby, the integer operation unit 4 executes the MUL instruction from the third selector 215 through the decoder 9.

As described above, under the control of the decision circuit 217 incorporated in the control circuit 21 in the microprocessor 1 according to the present invention, when FM=10, the integer operation unit 4 executes the sub instruction to be executed firstly, and the integer operation unit 4 executes the following sub instruction only when the integer operation unit 4 can execute the following sub instruction. In this case, for example, when the integer operation unit 4 can not execute the following sub instruction, the memory access unit 3 as another operation unit executes the following sub instruction.

In conventional microprocessors, operation results obtained by operation units such as the memory access unit 3, the integer operation unit 4, and so on are transferred and stored into the register file such as the general purpose register 5 and other registers during following operation cycles. In addition, the conventional microprocessors commonly incorporates dedicated bypasses (omitted from diagrams) to transfer operation results in each same operation unit when a data hazard occurs. It is thereby possible to halt the reading of operation results that have already been stored in the registers during the preceding cycles and it is thereby possible to transfer, through one of the dedicated bypasses, an operation result of a preceding sub instruction that is immediately executed by an operation unit to the same operation unit, when this same operation unit can execute a following sub instruction. However, it is impossible to transfer the operation result obtained by one operation unit to a different operation unit when a data hazard happens between the different operation units because a delay value of the data transfer through the dedicated bypass becomes greater.

On the other hand, in the microprocessor of the present invention, the same operation unit can execute a following sub instruction in addition to a preceding sub instruction under the control of the control circuit 21. Thereby, the dedicated bypasses can be used for other pipelines. This causes to increase the performance of the operation of the microprocessor.

As described above, the control circuit 21 in the instruction decode unit 2 in the microprocessor as a preferred embodiment according to the present invention incorporates the decision circuit 217. This decision circuit 217 controls so that the memory access unit 3 as another operation unit other than the integer operation unit 4 executes a following sub instruction when this decision circuit 217 decides that the integer operation unit 4 can not execute the following sub instruction, for example. It is thereby possible for each of the plurality of operation units to use the dedicated bypasses efficiently and to increase the operation speed of the microprocessor. Thereby, it is possible to increase the efficiency of the total operation of the microprocessor.

In the explanation described above, the microprocessor 1 has the configuration in which the two operation units such as the memory access unit 3 and the integer operation unit 4 are incorporated, but, the present invention is not limited by this configuration, for example, it is possible for the microprocessor to incorporate more than two operation units. This configuration of the microprocessor can get the same effect.

As described above, according to the present invention, the instruction decode unit as instruction decode means incorporates the control circuit as control circuit to control so that the first instruction execution means that has executed the first sub instruction at first executes the following second sub instruction when the plurality of instruction execution means such as the memory access unit and the integer operation unit are execute the plurality of sub instructions. In particular, the decision circuit incorporated in the control circuit controls so that the memory access unit as another instruction execution means other than the integer operation unit executes the following sub instruction when the decision circuit decides that the integer operation unit can not execute the following sub instruction. It is thereby possible to use the dedicated bypasses efficiently by the plurality of instruction execution means. Therefore the present invention has the effect to increase the performance of the microprocessor because the total efficiency of operations executed by the microprocessor can be increased.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A microprocessor comprising:
    a memory circuit for storing instructions for a single operation, each instruction including a plurality of sub instructions for controlling a plurality of operations, and data;
    an instruction decode unit for decoding the instructions that are read from said memory circuit;
    a plurality of instruction execution means, connected to said instruction decode unit, for executing said plurality of sub instructions sequentially and independently in parallel, based on decoded results of said instructions transferred from said instruction decode unit; and
    a control circuit, incorporated in said instruction decode unit, for controlling said plurality of instruction execution means so that a first instruction execution means that has executed a first sub instruction is able to execute a following second sub instruction when said plurality of instruction execution means execute said plurality of sub instructions sequentially, wherein said control circuit controls so that said first instruction execution means executes said following second sub instruction when said control circuit decides that the first instruction execution means in said plurality of instruction execution means is able to execute said following second sub instruction, even if a second instruction execution means is able to execute the second sub instruction.

2. A microprocessor according to claim 1, wherein said control circuit comprises:

decision circuit for inputting said instructions, each of said instructions includes said plurality of sub instructions, transferred from said memory circuit and analyzing said instructions, and for deciding that one of said plurality of instruction execution means is able to execute one of said plurality of sub instructions;

an exchange circuit for exchanging bit strings designating said plurality of sub instructions under controlling of said decision circuit;

a first selector for selecting one of said plurality of sub instructions under the control of said decision circuit, and for outputting said selected sub instruction; and a plurality of selectors, each of which is connected to said first selector and each of said plurality of instruction execution means, and each of which selects one of said selected sub instruction and NOP instruction under controlling of said decision circuit.

3. A microprocessor comprising:

a memory circuit for storing instructions for a single operation, each instruction including a plurality of sub instructions for controlling a plurality of operations, and data;

an instruction decode unit for decoding the instructions that are read from said memory circuit;

a plurality of instruction execution means, connected to said instruction decode unit, for executing said plurality of sub instructions sequentially and independently in parallel, based on decoded results of said instructions transferred from said instruction decode unit; and a control circuit, incorporated in said instruction decode unit, for controlling said plurality of instruction execution means so that a first instruction execution means that has executed a first sub instruction is able to execute a following second sub instruction when said plurality of instruction execution means execute said plurality of sub instructions sequentially, wherein said control circuit controls so that second instruction execution means in said plurality of instruction execution means executes said following second sub instruction when said control circuit decides that said second instruction execution means is not able to execute said following second sub instruction.

4. A microprocessor according to claim 3, wherein said control circuit comprises:

decision circuit for inputting said instructions, each of said instructions includes said plurality of sub instructions, transferred from said memory circuit and analyzing said instructions, and for deciding that one of said plurality of instruction execution means is able to execute one of said plurality of sub instructions;

an exchange circuit for exchanging bit strings designating said plurality of sub instructions under controlling of said decision circuit;

a first selector for selecting one of said plurality of sub instructions under the control of said decision circuit, and for outputting said selected sub instruction; and a plurality of selectors, each of which is connected to said first selector and each of said plurality of instruction execution means, and each of which selects one of said selected sub instruction and NOP instruction under controlling of said decision circuit.

5. A microprocessor comprising:

a memory circuit for storing instructions for a single operation, each instruction including a plurality of sub instructions for controlling a plurality of operations, and data;

an instruction decode unit for decoding the instructions that are read from said memory circuit;

a plurality of registers for storing control data to control the execution of said instructions;

a plurality of instruction execution means, connected to said instruction decode unit, for executing said plurality of sub instructions sequentially and independently in parallel, based on decoded results of said instructions transferred from said instruction decode unit and control data stored in said plurality of registers; and a control circuit, incorporated in said instruction decode unit, for controlling said plurality of instruction execution means so that a first instruction execution means that has executed a first sub instruction is able to execute a following second sub instruction when said plurality of instruction execution means execute said plurality of sub instructions sequentially, wherein said control circuit comprises:

a decision circuit for inputting said instructions, each of said instructions includes said plurality of sub instructions, transferred from said memory circuit and analyzing said instructions, and for deciding that one of said plurality of instruction execution means is able to execute one of said plurality of sub instructions;

an exchange circuit for exchanging bit strings designating said plurality of sub instructions under controlling of said decision circuit;

a first selector for selecting one of said plurality of sub instructions under the control of said decision circuit, and for outputting said selected sub instruction; and a plurality of selectors, each of which is connected to said first selector and each of said plurality of instruction execution means, and each of which selects one of said selected sub instruction and NOP instruction under controlling of said decision circuit.

* * * * *